United States Patent [19]

Meier

[11] Patent Number: 4,936,736

[45] Date of Patent: Jun. 26, 1990

[54] APPARATUS FOR TRANSFER OF RODS OR RAILS BETWEEN A HOLDER CASSETTE AND STORAGE RACKS

[75] Inventor: Valentin Meier, Offenburg, Fed. Rep. of Germany

[73] Assignee: Keuro Maschinenbau Gesellschaft mit beschränkter Haftung & Co. Kommanditgesellschaft, Gamshurst, Fed. Rep. of Germany

[21] Appl. No.: 317,970

[22] Filed: Mar. 2, 1989

[30] Foreign Application Priority Data

Apr. 15, 1988 [DE] Fed. Rep. of Germany ....... 3812529

[51] Int. Cl.⁵ .............................................. B65G 47/00
[52] U.S. Cl. ............................... 414/746.1; 414/746.4; 198/443; 221/254
[58] Field of Search ............... 414/745.1, 745.7, 745.9, 414/746.1, 766.3, 746.4, 746.8; 198/443; 221/254

[56] References Cited

U.S. PATENT DOCUMENTS

| 3,724,648 | 4/1973 | Schaller .............................. 198/443 |
| 3,810,404 | 5/1974 | Stolzer . |
| 4,174,662 | 11/1979 | Klusmier ...................... 414/746.4 X |

FOREIGN PATENT DOCUMENTS

| 849344 | 8/1970 | Canada ............... 414/745.7 |
| 2412380 | 9/1975 | Fed. Rep. of Germany . |
| 0091267 | 8/1978 | Japan ................................. 414/746.4 |
| 463918 | 11/1968 | Switzerland ..................... 414/746.4 |
| 873341 | 7/1961 | United Kingdom ............. 414/745.7 |

Primary Examiner—Frank E. Werner
Assistant Examiner—James T. Eller, Jr.
Attorney, Agent, or Firm—Frishauf, Holtz, Goodman & Woodward

[57] ABSTRACT

Transfer between a cassette (8) and a storage region formed by bar elements (10, 10') is obtained by an automatic apparatus which includes lifting blades (4, 5) passing through an interrupted bottom of the cassette, and having inclined upper edges (36, 35) to form a V-shaped notch, within which rods (33) will collect. Adjacent the cassette, a slide path is formed, extending longitudinally of the cassette, by a plurality of plate elements (14) having an upper inclined edge (17). Upon lifting of the blades (4, 5) and shifting of one blade with respect to the other, rods (33) are taken out of the V notch and can slide over the slide path. The slide path terminates at a movable stop element (24) which can slide in a path parallel to the slide path. A plurality of pivotable plate-like segments are located in the spaces between the segments of the slide path, which, upon pivoting from beneath the slide path plates upwardly, transfer rods from the slide path over the stop elements to the receiving bars (10, 10'). To reverse the operation, the stop element is lowered, so that the bars can slide over the stop element on the slide path, to be dropped by pivoting of the pivot element, for subsequently pushing the rods along the slide path by the stop elements to be received in the V notch of the lifting blades, and and subsequently lowered into the cassette.

20 Claims, 12 Drawing Sheets

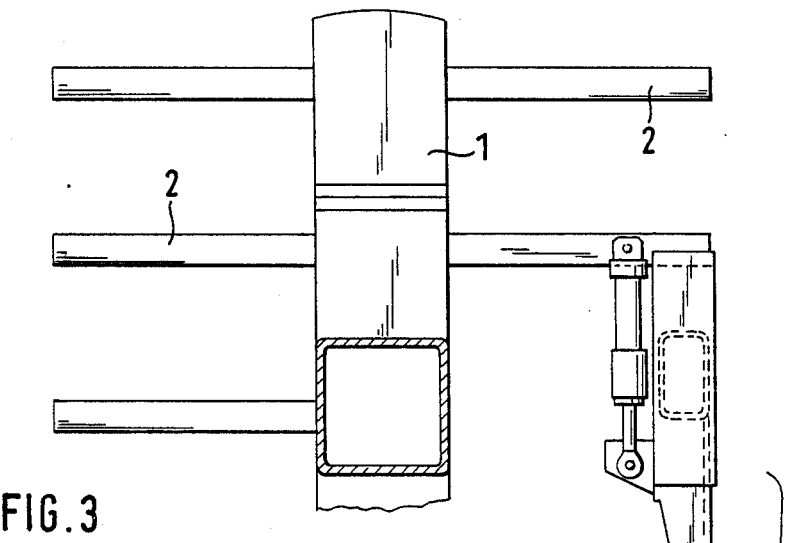
FIG.3
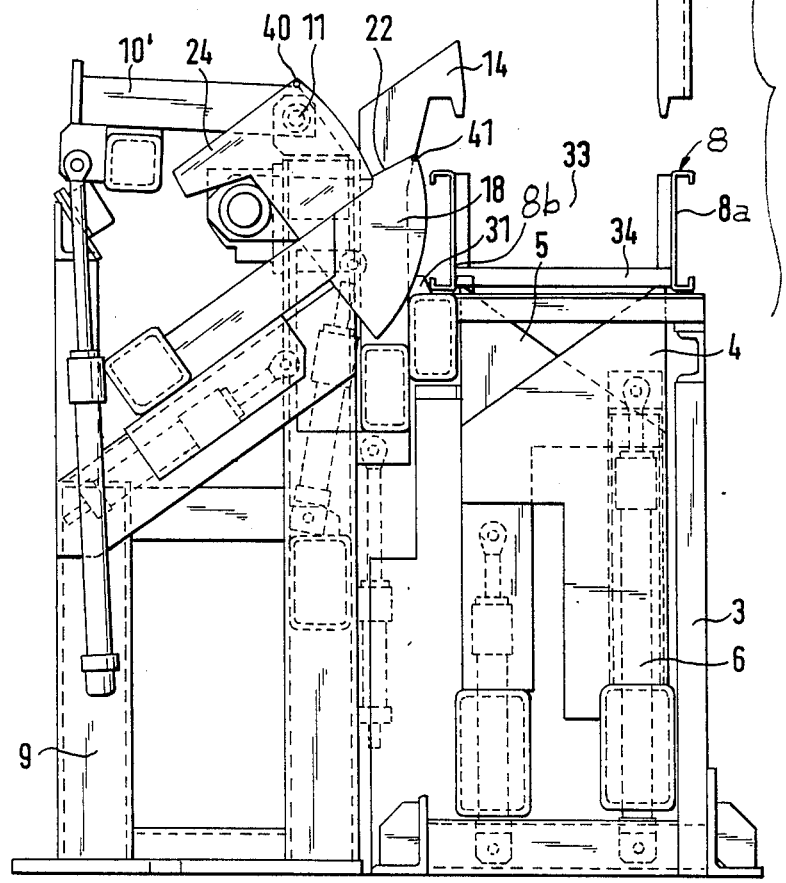

APPARATUS FOR TRANSFER OF RODS OR RAILS BETWEEN A HOLDER CASSETTE AND STORAGE RACKS

Reference to related patent and application, the disclosures of which are hereby incorporated by reference:

U.S. Pat. No. 3,810,404, Stolzer, (to which German Patent 24 12 380 corresponds). U.S. Ser. No. 07/248,778, filed Sept. 23, 1988, Stolzer now Pat. No. 4,881,634, issued Nov. 21, 1989.

FIELD OF INVENTION

The present invention relates to material handling apparatus, and more particularly to apparatus for handling and transferring elongated material such as rods, rails and the like, between a holder cassette and rack or shelf units. For short, the elongated materials will be referred to hereinafter generically as "rods".

Background

It is frequently necessary to transfer rods from a storage shelf or storage rack to a machine which works on the rods, for example cuts them to predetermined lengths, wraps a plurality of rods for delivery and the like. For automated or semi-automated handling, it is desirable that rods removed from a storage rack are first placed into a holder or cassette for further transport, and that remainder pieces, for example rods from which ends have been cut, are returned for storage, using the same cassette or holder for transport.

To remove rod material from a holder cassette which, typically, in plan view is essentially rectangular, the cassette has an open bottom, for example formed of spaced cross elements, through which vertically movable blades can pass in order to lift the rods out from the cassette or holder. The cassette usually can be positioned on a shelf or rack adjacent the storage rack for the rods, in parallel thereto, with some space between the edge of the cassette and the rack.

Arrangements of this type are particularly important in multiple vertically arranged racks in which the respective levels of the racks retain the rods either loosely or in wrapped bundles. The loose rods and/or the bundles can then be loaded in the cassettes. The racks are used for storing the rods so that, as required, they can be removed, for working thereon, for example cutting to predetermined length, slitting, or placing threads on the rods, or otherwise working thereon, for example on a lathe.

Various types of arrangements have been used to transfer the rods from the racks to working machinery or to transport apparatus. When used with cassettes, it has been customary to place the cassettes at the respective positions of the shelves or racks, designed for specific handling of various types of rods at predetermined positions of the racks. This is expensive andd space-consuming. The space which is taken up by the cassettes not immediately in use extends the width of the storage structure.

Inventory control of rods, particularly of many different types of rods, that is, rods of different materials, sizes, or cross-sectional shapes, further presents a problem. The quantity of the stored rods, as well as the quantity of rods removed and the respective lengths, must be recorded and, upon each movement of any particular rod from any storage space, the record must be changed, so that at any time a record will be available as to which quantity of what material and of what type is on hand in the warehouse in which the storage arrangement is placed. This is necessary, further, so that if the stored quantity of any specific types of rods drops below a certain limit, re-orders can be placed with a supplier.

U.S. Pat. No. 3,810,404, the disclosure of which is hereby incorporated by reference, describes a special-purpose material handling structure, designed exclusively for immediate supply of rod material to a severing or cutting machine. This arrangement is suitable only for removing and restoring of rod material which is located in a cassette, and to be worked on by the cutting machine. The arrangement was not intended to be suitable for general supply or transfer of any types of rods, or transfer of rods to tools or users other than the specific machinery described in the patent. A typical user may, for example, be a carrier arm of a hoist, so that the rods can be further transported, for example for delivery to a construction site. The system described in the referenced Pat. NO. 3,810,404 was not designed for such a purpose and not suitable therefor since the storage rack is at the side remote from an aisle passing between the racks and next to a position for a cassette. Hoists or cranes cannot reach such positions. Further, the device as described is not suited for storing, or removing from storage, any kind of rod material so that a storage rack can be loaded or unloaded with any kind of elongated rod material. Placing rods in the cassette must be done at a remote position.

The Invention

It is an object to provide an apparatus which, preferably entirely automatically, permits transfer of elongated materials, such as rails or, for short and in general, rods, and which permits handling of a plurality of rods, singly or in bundles, or single rods. The apparatus, further, should not take up space beyond the projection of the shelf unit as such, so that it can be almost part of a rack element. This permits adapting the apparatus to existing racks. As a further object, the arrangement should be so constructed that it is simple to count rods being transferred between the rack and the cassette and obtain, during the transfer operation, electrical data representative of the quantity of transferred rods so that the counting or sensing apparatus can be coupled directly to an inventory control computer. Simplicity, reliability and sturdy construction with adequate weight-handling capability, of course, are basic requirements of such an apparatus.

Briefly, the storage racks are formed by a plurality of longitudinally staggered, privately retained but essentially horizontal support bar elements. These bar elements may be rollers, and "essentaily horizontal" is intended to mean that they can be pivoted slightly to be inclined with the angle of inclination shifted and varied with respect to a horizontal plane, without deviating substantially therefrom. This permits moving the rods on the bar elements by gravity. The holder cassettes which are to hold the rods, in plan view, are essentially rectangular, are formed with side walls or side ribs, and have an interrupted bottom. The term "interrupted" bottom or "interrupted" side is here intended to mean that the respective structure is formed by essentially parallel ribs through which operating elements can pass, for example to lift the rods out of the bottom of the cross ribs forming the cassette.

A support is provided to position the holder cassette laterally adjacent, but spaced from the support bar elements, and at a level or elevation which is below that of the support bar elements. Lifting blades are movable vertically through the interrupted bottom of the cassette to raise the rods therein from the bottom thereof; preferably, for any lifting station two lifting blades with mutually inclined surfaces are provided, forming an essentially V notch for positive retention of the rods therein. A longitudinally extending slide path is formed, again with an interrupted bottom, for example by a plurality of plate elements, staggered along the length of the rods. The slide path is positioned laterally adjacent and above the upper edge of the side elements of the cassette, and is inclined away from the cassette and towards the rack bar elements, the slide path bridging the space between the holder cassette and the support elements. A stop arrangement, for example formed of a plurality of slidable or of pivotable plates, is located adjacent the lower side of the slide path. A group of lifting elements, movable from a position near the lower side of the slide path and beneath the slide path plates to a position above the slide path, and at least even with the level of the support bar elements, transfers the rods from the slide path positioned along the stops and over and on the support elements. If desired, and if the support elements are rollers, the rods can be rolled longitudinally on he support elements.

In accordance with a preferred feature, the lifting arrangement is formed as pivotable segmental plates, pivotable about a horizontal axis parallel to the sides of the cassette, to pivot from a position below the plate elements upwardly through the longitudinally interrupted slide path and along the stops to a final position at least flush, or slightly above the support bar elements.

The apparatus has the advantage that it fits within the outline of a storage rack, so that it can be fitted, for example, between the sides of the storage rack and adjacent a walk or a material handling aisle, so that material handling elements such as hoists, traveling cranes and the like, can operate in the aisles without interference from cassettes placed thereon. Further, it permits placement of cassettes from one aisle on the apparatus, and removal of the cassette therefrom, thus permitting placement of various rod elements, as selected, by merely shifting one cassette.

The same hoist can also reach the bar elements from another aisle of the structure which, again, can be constructed similarly to an elongated rack bin. This permits rods removed from a cassette and transferred to the bar elements to be removed, if desired, from the hoist and carried to a utilization station or some other destination, for example a special rack for storing only loose or odd rods. The racks, further, can be used as an intermediate holding structure for storing rods for subsequent transfer into a cassette which is then transported to anotheer rack to fill the bar elements of another rack for long-term storage, for example.

Leaving a space or gap between the cassette and the bar elements permits easy and uncomplicated reliable handling. The gap is bridged by the slide path, permitting the rods to slide transversely to their length until they hit the stop. The lifting apparatus then lifts the rods as desired, singly or in groups, and regardless of the sequence of arrival of the rods. This provides for reliable handling, and further reliable separation of rods which, then, permits reliable automatic counting, for example by an electrical sensor. The electrical sensor can be of the contacting type, for example a wiper engaging a microswitch; or it can be non-contacting, for example including an opto-electrical sensor.

The blades which lift the rods preferably are constructed to operate in unison, and have, at their upper sides, mutually directed inclined surfaces to form an essentially V-shaped notch for reliable placement of the rods therein. These blades can pass through the interrupted bottom of the cassette, that is, between the ribs which define the bottom of the cassette. The plates extend transversely to the longitudinal direction of the rods, and have a width which corresponds at least roughly to the interior clear dimension of the cassette. One of the blades is inclined towards the slide path, and the other has an opposite inclination. Aligned blades preferably operate in unison, for example by being coupled to connecting bars or rails, and each one of the groups of lifting blades is preferably operated by its own lifting mechanism which, for example, may be any power apparatus to provide for longitudinal travel, such as hydraulic or compressed air cylinder - piston arrangements, rack-and-pinion extension apparatus, positioning spindles or, in general, any apparatus which provides for longitudinal movement of a power element.

Using the individual elements of the slide path to bridge the gap between the cassette and the bar elements has the additional advantage that specific stop elements for individual rods, which would have to be adjusted for the size and/or shape of the rods or, for bundles of rods are not needed, while still handling the rods and/or bundles in individualized manner.

The lifting blades, by being arranged as described, and having respectively inclined upper surfaces are synchronously operated but individually powered. This permits initially collecting the rods in the V-shaped notch formed by the upper edges of the plates, as the plates pass through the interruped bottom of the cassettes. As so collected, the rods are pushed upwardly. This movement continues until the highest point of the upper edge of one of the blades is level with the adjacent longitudinal edge of the cassette or, respectively, the uppermost edge of the slide path. The lifting plates at the side opposite the slide path can then be lifted individually, thus shifting the position of the apex of the V from a central position over towards the slide path, and causing the rods in the V notch to move gradually over towards the slide path so that, finally, they can roll or slide or slip unto the slide path individually, in dependence on whether the rods are round or have polygonal cross section. The apparatus transferring the rods from the slide path to the bar elements can be used, similarly, to transfer rods from the bar elements into a cassette.

DRAWINGS

FIGS. 3 through 12 illustrate the apparatus of FIG. 1 in different operating positions to show steps during a loading and an unloading sequence of rods on a rack.

DETAILED DESCRIPTION

Figure 1:
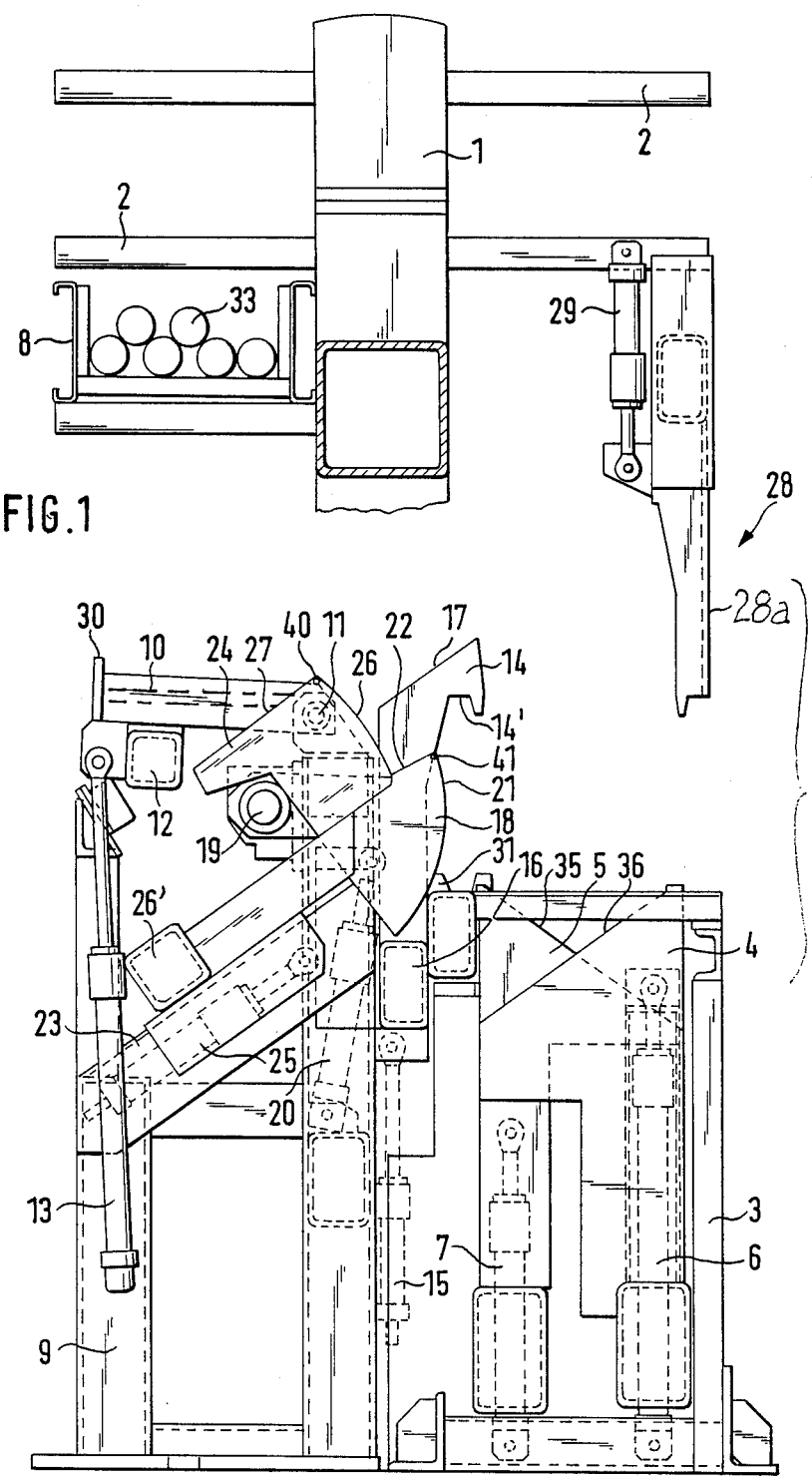
FIG. 1 is a general side view of the apparatus, omitting all elements not necessary for an understanding of the invention.

A storage rack system 1 extends perpendicularly to the plane of the drawing. A plurality of staggered arms, all located in planes at different spacings perpendicularly to the plane of the drawing, form the respective racks or storage bin regions.

The bottom surface projected by the rack retains the apparatus which will be described in detail, used to transfer rods for storage or reception from the rack system.

The apparatus, first, includes a frame 3 which extends perpendicularly to the plane of the drawing beneath the rack elements 2 extending to the right from a central support post of the rack, with respect to FIG. 1. Lifting blades 4 and 5 are vertically movable by individual cylinder-piston units 6, 7. The lifting blades have a width which extends across the width of the frame 3 and across cassettes 8 (FIGS. 3 to 12) which can be placed on the frame 3. A support frame 9 is located to the left of the frame 3 beneath the left rack arms 2 of the rack 1. The support 9 is spaced laterally from the frame 3 and includes a group of bar elements 10 which are positioned at a level above the cassette 8 to form a group of support bars for the rods 33 (FIGS. 8-12). The bars 10, thus, all together, see FIG. 2, define overall a support plane. The bars 10 are pivotably secured to the support 9, to pivot about a common axis or shaft 11, laterally of the frame 3. The opposite or far left ends of the bars 10 are commonly connected by a lifting rail 12 which is coupled to a cylinder-piston unit 13 to permit the bar elements 10 to be slightly lifted or depressed from a horizontal position. The bar elements, in rest position, are horizontal, or slightly inclined towards the left; hereinafter, they will be referred to as being "essentially" horizontal, although it is to be understood that some inclination from the horizontal is obtained by operating the cylinder-piston unit 13.

The support frame 9 retains a plurality of hold-down elements 14. The hold-down elements 14 are vertically shiftable by a cylinder-piston unit 15, pivotably attached to the support frame 9 and engaging on a rail 16. The rail 16 holds the plurality of hold-down elements 14 (FIG. 2) to operate in unison, and thus form a vertically shiftable element. The hold-downn elements 14 have an upper inclined edge 17 which, together, define a slide path which starts from the adjacent longitudinal edge of a cassette 8 (FIGS. 3 to 12) and extends, inclined downwardly, in the left side of direction of the support frame 9.

Figure 2:
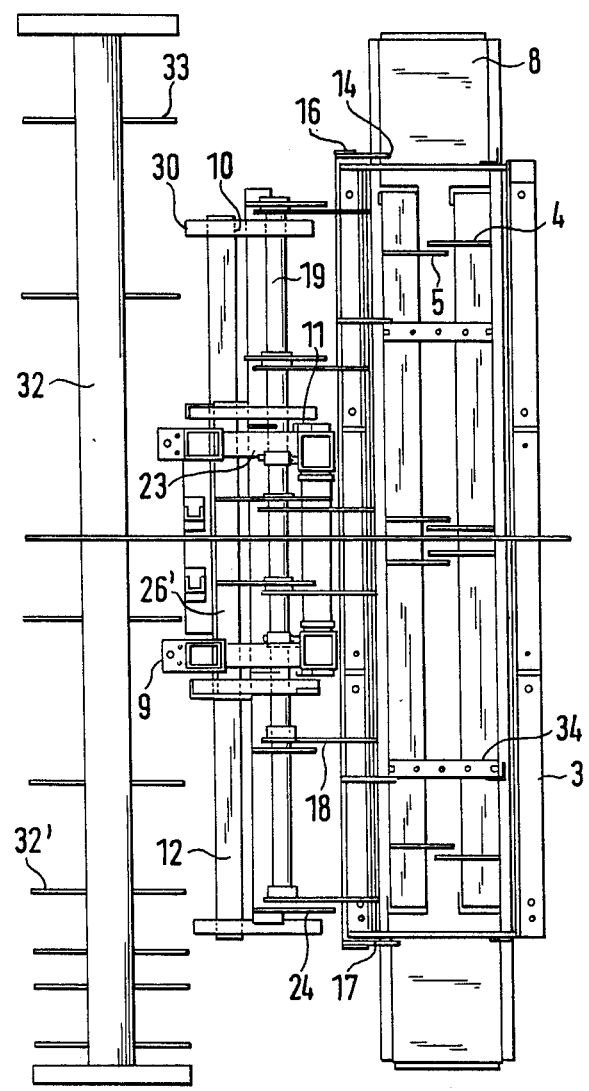
FIG. 2 is a top view, from above, of the apparatus.
Figure 4:
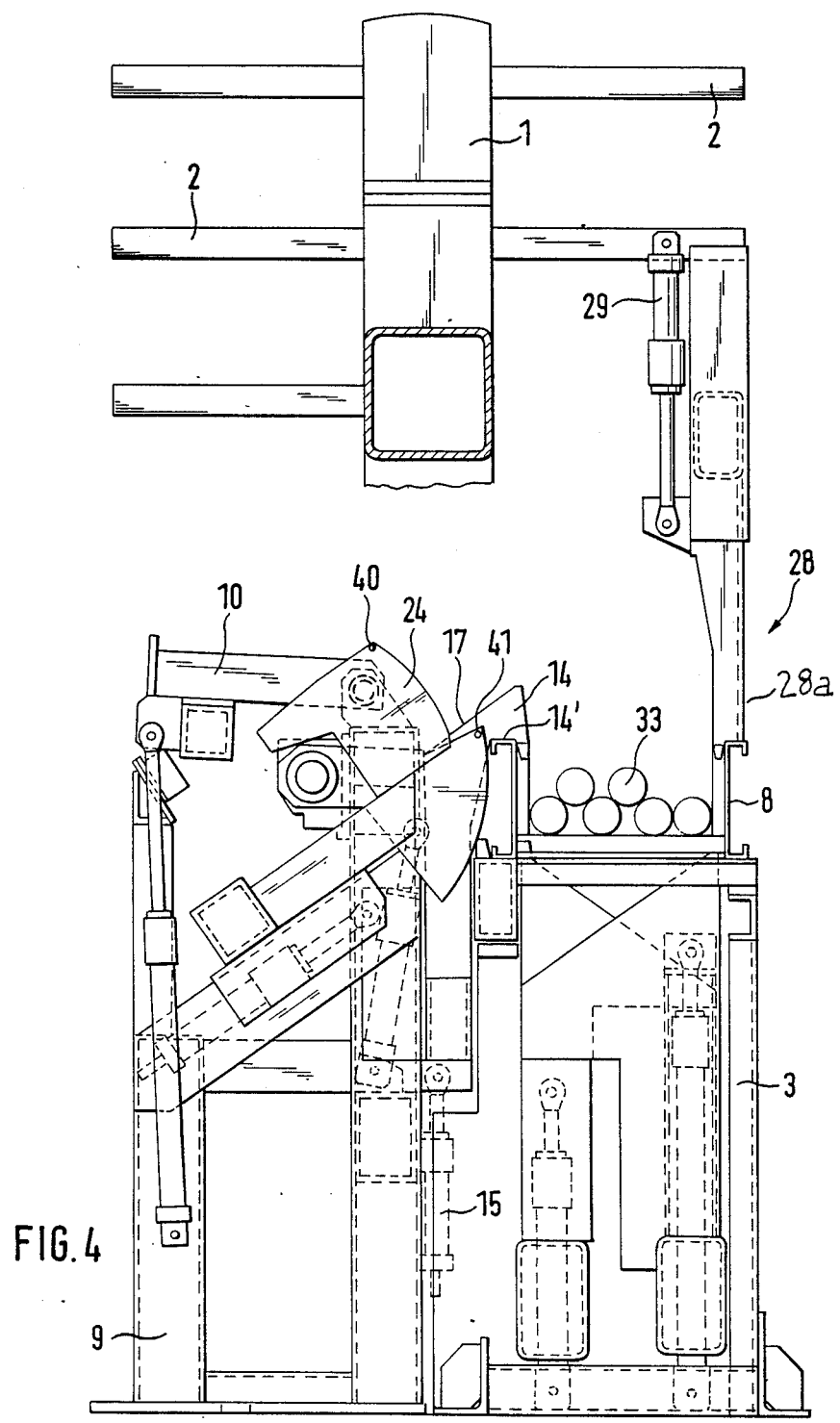

A plurality of lifting elements 18, formed as pivotable segments, can be raised or lowered. The pivot segments 18 can pivot about a common axis 19, and their position is controlled by a cylinder-piston unit 20. The segments 18 operate in a vertical slot space between the various elements secured to the support 9, as best seen in FIG. 2. The pivot segments 18 have an essentially circular front edge 21, with the center being the pivot axis 19. The front edge 21 is movable at slight distance from a cassette 8 secured to the frame 3. The segments 18 have an upper edge 22, which joins the essentaily circular or curved front edge 21. When the segments 18 are pivoted downwardly, see FIG. 4, and the hold-down elements 14 are engaged against the upper edge of a cassette 8, the upper edge 22 of the segment 18 corresponds, at least generally, to the edges 17 forming the slide path although it does not extend thereabove; it may be slightly below the edges 17, as seen in FIG. 4.

A plurality of pusher elements 24, staggered longitudinally of the rods 33 to be transferred, are positioned essentaily parallel to the edges 17 forming the slide path. They are retained on a track 23 formed on the support 9. A cylinder piston unit 25 slides the sliders or pushers 24 in unison. The sliders or pushers 24 are combined in a single unit by a rail 26'. The pushers 24 have a forward edge 26, see FIG. 1. Front edge 26 is curved and part-circular, and concentric to the shaft or axis 19. The upper edge 27 is parallel to the slide path defined by the edges 17. When in the position shown in FIG. 1, pushers 24 are beneath the bar elements 10, and effectively recessed therebelow.

A holder arrangement 28 is secured above the frame 3 in any suitable manner on the rack 1. The holder arrangement 28 has a hold-down arm 28a which is vertically shiftable by a cylinder-piston unit 29, and is used to retain in position the side 8a of a cassette. The side 8b is held down by a hold-down element 14 (see Fig. 3). The arm 28a also prevents unintended drop-out of any rod 33 from the right side of the cassette, that is, over the edge of the side 8a—compare FIGS. 1 and 4.

the rods 33, located on the bar elements 10, are prevented from falling off the bar elements 10 by end stops 30. Centering elements 31, of which only one is visible in FIG. 1, ensures that the cassettes 8 are centrally located on the frame 3 and to define the position of the cassettes 8 thereon.

FIG. 2 illustrates, in general, the arrangement described and, additionally, shows a load beam 32, to be described below, and supported, for example, by a hoist or traveling crane. The load beam 32 has laterally projecting load tines 32', with which it can pick up and move individual rods.

The hold-down element 14 is formed with notches 14' at the side facing the cassette 8 to grip over the edge of the wall 8b (FIG. 3) of the cassette for positive holding of the cassette during transfer of rods therefrom or thereto.

OPERATION

FIGS. 3 to 12 illustrate various steps in transferring material to and from the rack structure, that is, from and into a cassette. The reference numerals referred to above have been similarly used, and applied where necessary, leaving off some reference numerals, however, for clarity of the drawings.

The bar elements 10 can be solid bars 10' (FIG. 3) or can be rollers 10, as shown schematically by the roller shaft in FIG. 1.

UNLOADING OF A CASSETTE, WITH REFERENCE TO FIGS 3-9

Figure 9:
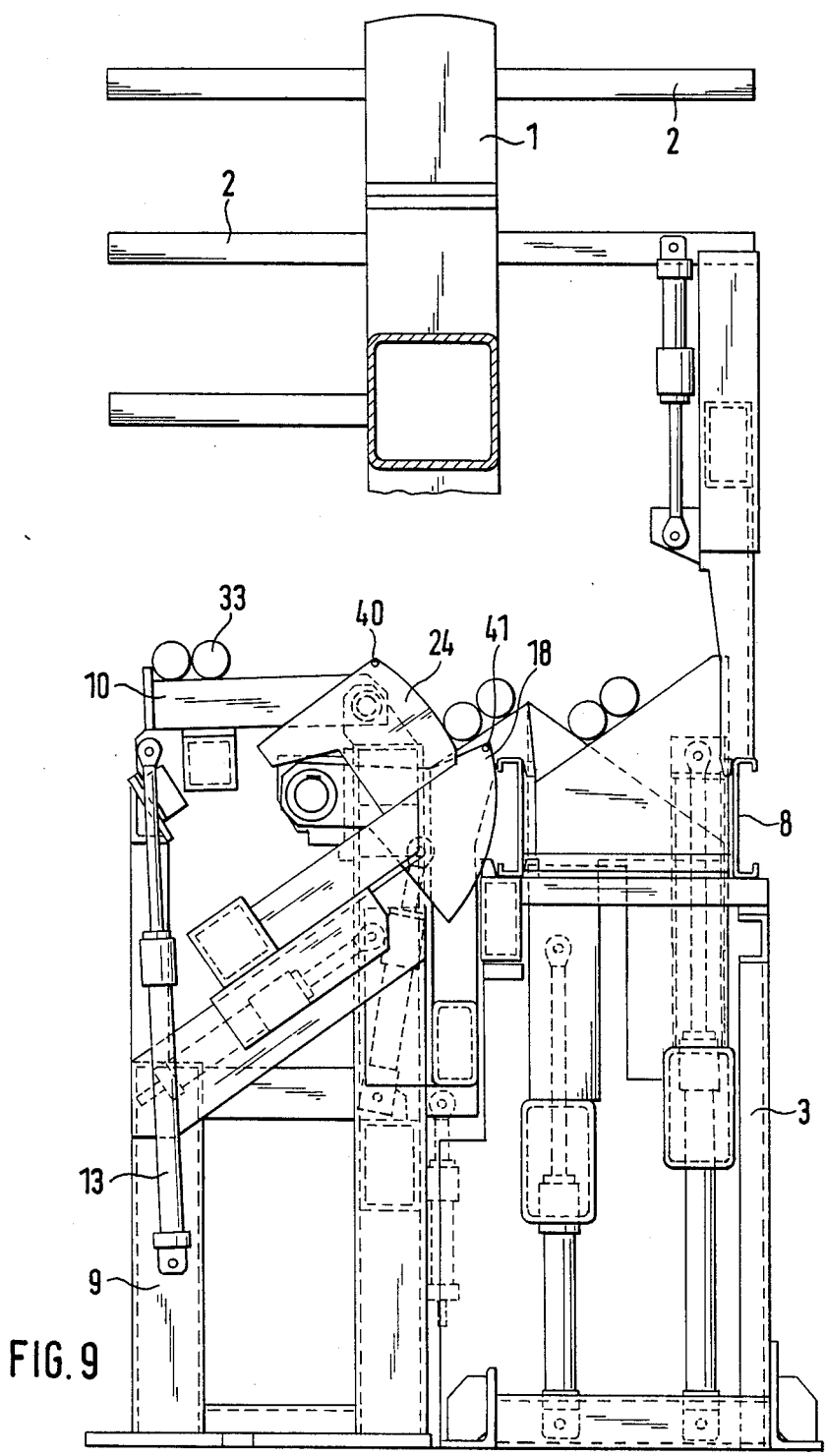

The differnce between FIGS. 3 and 9 is the showing of a cassette 8, placed on the frame 3, which, when considered together with FIG. 2, also shows that the cassette 8 is formed, essentially, by outer framing or rib elements 8a, 8b and cross elements 34 forming the bottom of the cassette. The cassette, thus, has an interrupted or broken bottom, to permit passage of the blades 4, 5, through the bottom of the cassette. The side walls 8a, 8b can be solid or interrupted.

FIG. 3 further shows the cassette placed between the centering stops 31, so that its longitudinal position, transverse to the plane of the drawing, is determined.

In the first operating step, the hold-elements 14 and 28 are lowered, by operating the cylinder piston units 15, 29. The hold-down elements are shifted until the notches 14' engage the left side wall 8b of the cassette 8 and hold it down; the hold-down element 28 is lowered until it engages, also with a small notch, the right side wall 8a of the cassette.

The cassette 8, thus, is reliably positioned by the stops 31 and held in the position; at the same time, the position of the slide path, defined by the edges 17 of the hold-down elements 14 is determined relative to the cassette.

Figure 5:
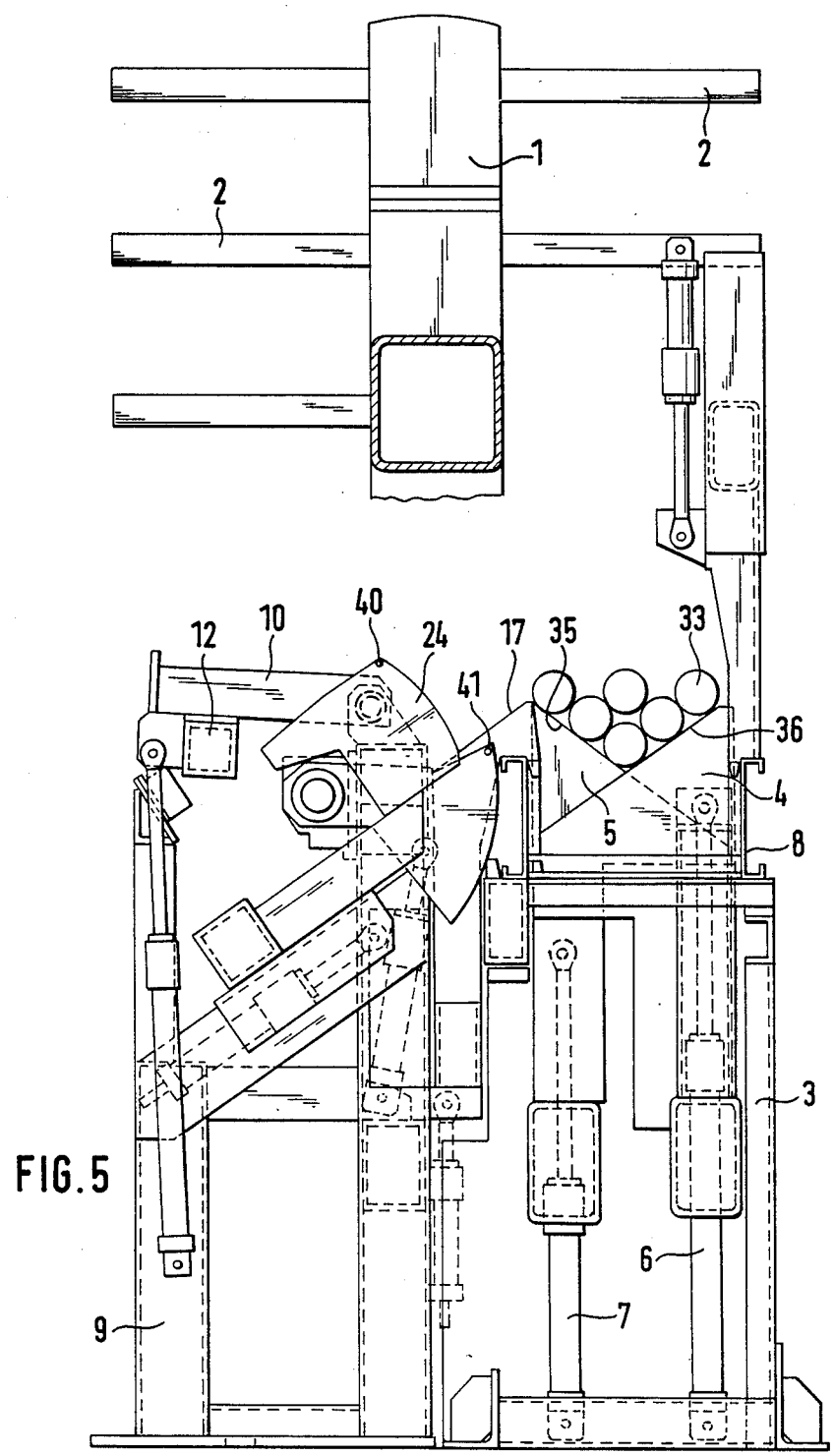

The rods 33, located on the bottom rails 34 of the cassette, are now lifted. They can be located on the bottom rail of the cassette at random. As shown in FIG. 5, by simultaneously lifting the plates 4, 5 by operating the cylinder-piston unit 6, 7, the plates 4, 5 pass through the bottom of the cassette 8 and lift the rods 33. The V notch which will form between the lifting blades 4, 5 will place the rods roughly in the position shown in FIG. 5. The two blades 4, 5 are raised until the plate 5, which is adjacent the slide path formed by the edges 17, forms a tip with the upper edge 35 of the plate 5, that is merges essentially with the tip of the slide path. The upper edge 36 of the plate 4, togethr with the upper edge 35, forms the V-shaped notch in which the rods 33 are now bundled and retained close to each other.

Figure 6:
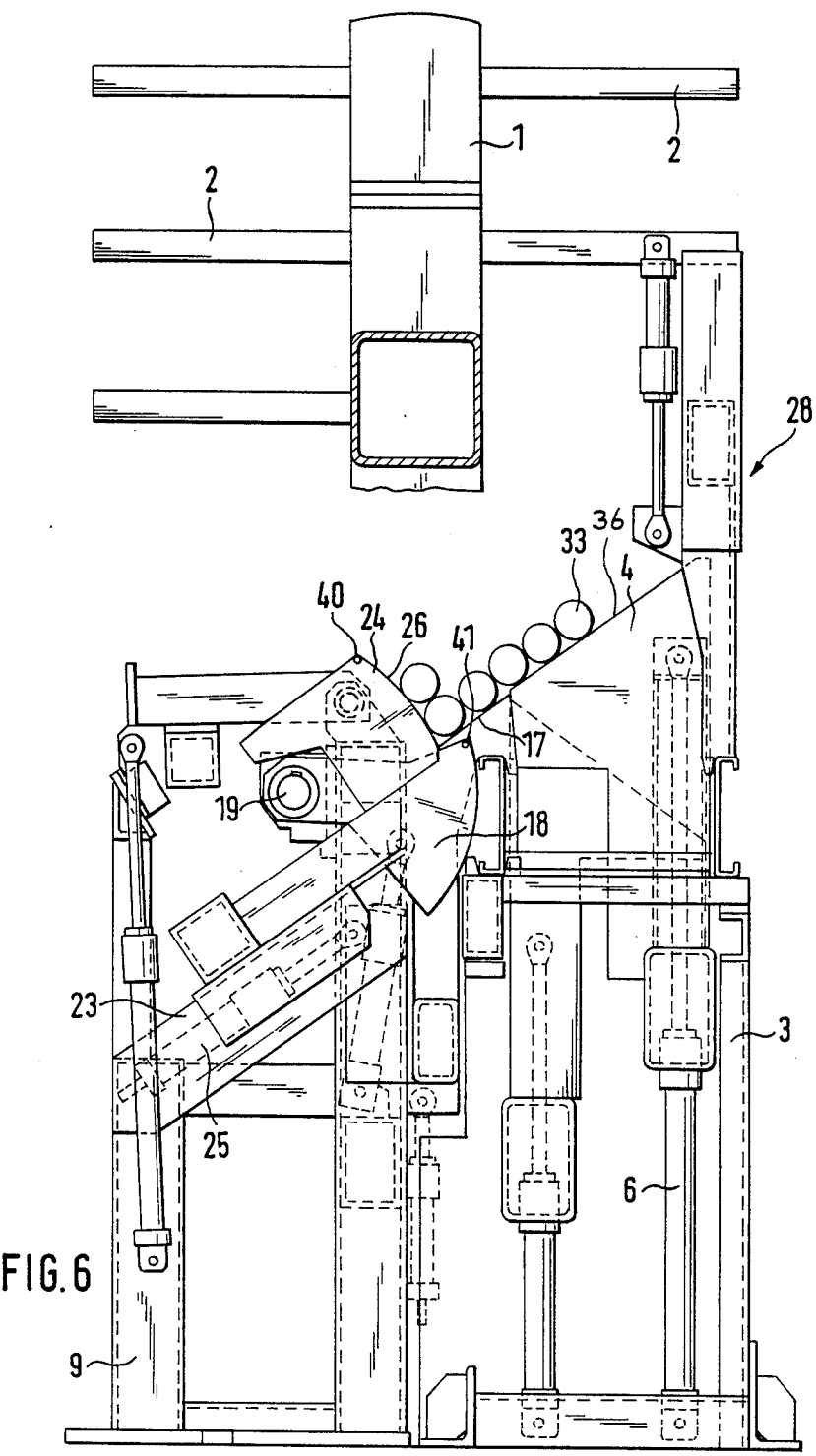
Figure 7:
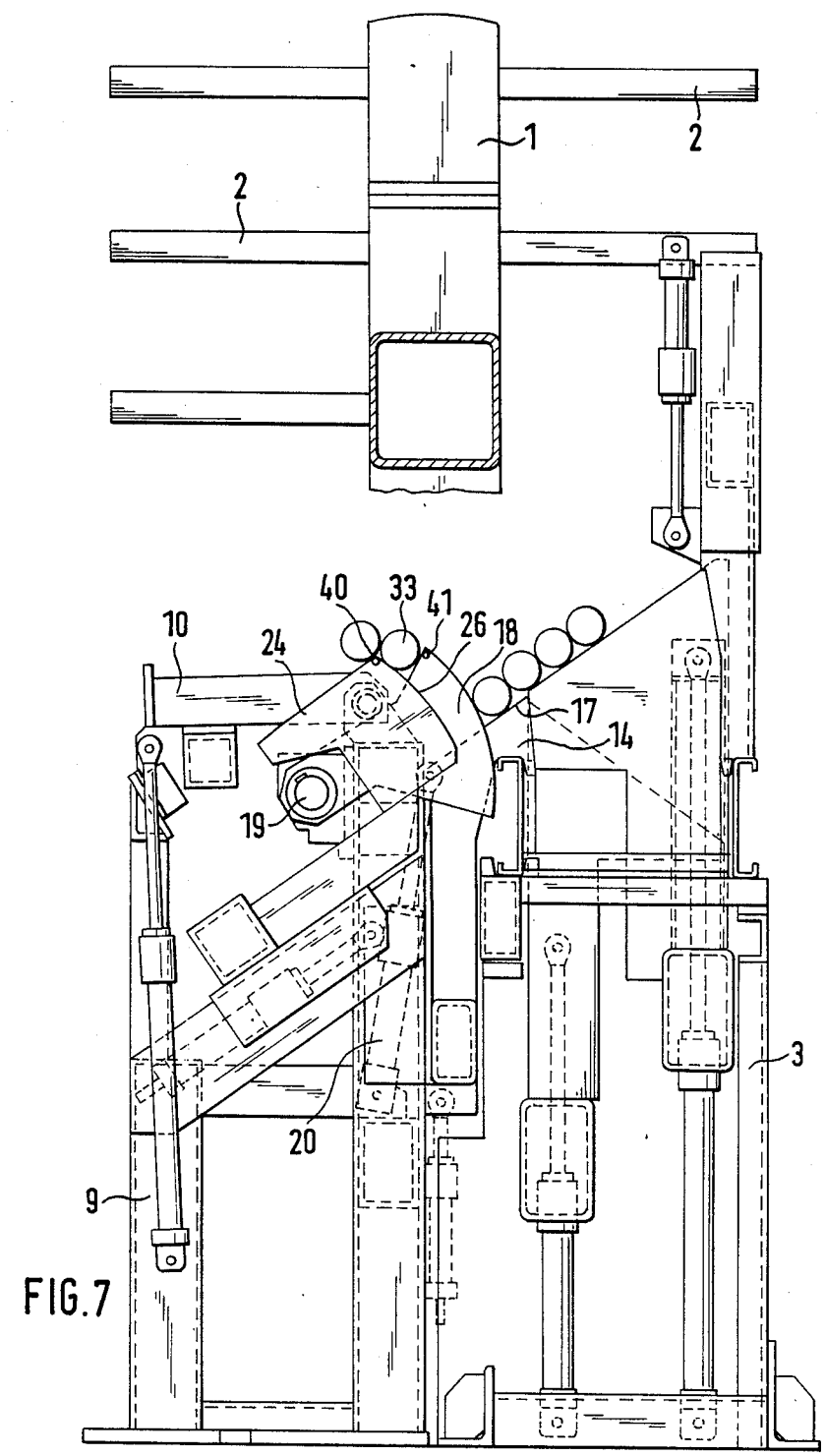

FIG. 6 shows the next step in which the plate 5 is now held stationary, but plate 4 is further lifted upwardly so that the rods 33 are lifted from the cassette 8 upwardly beyond the level of the slide path 17. If the rods are round, they will roll off; if polygonal, they will slide off, and slide from the upper edge 36 of the plate 4 unto the slide path formed by the edges 17. The foremost rods will engage against the front edge 26 of the sliders 24, which will form a stop or abutment for the rods 33. This stop or abutment position can be so controlled by respectively operating the cylinder-piston units 25 that the sliders 24 will slide along the track 23 such that the pivot segments project with respect to the front edge 26 of the slider 24 only by the dimension of the cross section of one of the rods 33. This projection is radial with respect to the axis 19. The position of the slider 24, in combination with the pivot segment 18, thus, readily permits variably adjusting the respective elements to the particular cross-sectional dimension of the rod 33. FIG. 7 illustrates the next step, in which the pivot segments 18 are pivoted by force of the cylinder-piston unit 20 about the axis 19. Pivoting is upwardly over the slide path formed by the edges 17, so that the rods 33 will roll or slip along the front edge 26 of the sliders or stop elements 24 in the direction of the bar elements 10, 10'.

Figure 8:
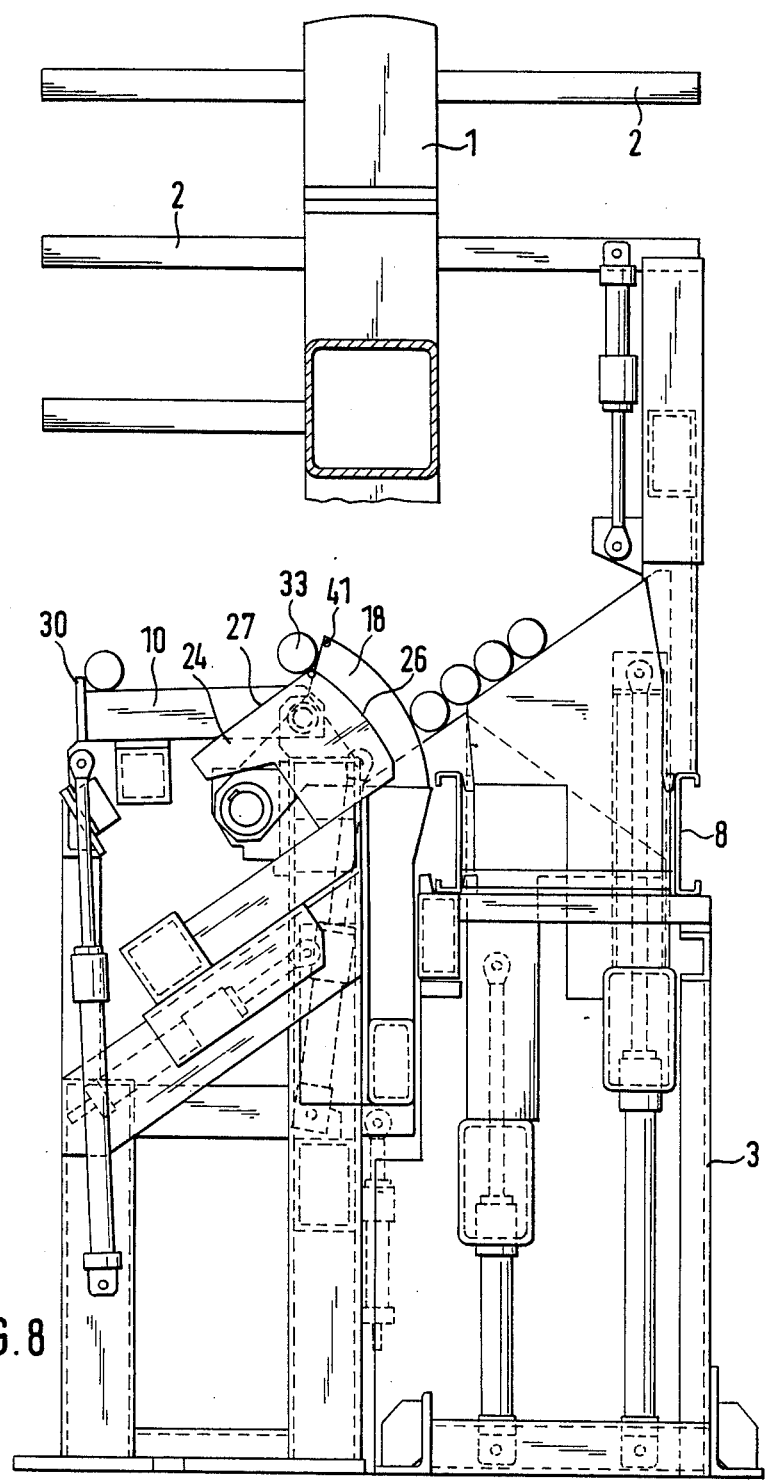

FIG. 8 shows the next step in the cycle, in which the rod 33 is tipped over the front edge 26 and the upper edge of the slider 24 by further rotation of the segments 18. The rods 33, thus, are lifted over the peak formed by the intersection of the edges 26, 27 of the slider 24, and slide or roll on the bar elements 10, 10'. As shown, the bar elements 10, 10' are sightly deflected downwardly towards the left from the horizontaly so taht they can easily roll or slip to the end stop 30.

As seen in FIG. 9, the operation of the segment 18 can be repeated. As a result, a defined and clearly countable quantity of individual rods can be placed on the bar elements 10, 10' by merely rotating the segments 18 up and down below and above the slide path formed by the edges 17 of the hold-down elements 14. Individual rods will slide forwards against the slider 24, are sequentially lifted on the bar elements 10, 10', and, in the process of passing about the tip, can be counted. The bar elements 10, thus, can form an intermediate storage or holding region of the material in advance of further working thereon. This saves time since, by changing cassettes, the next material can be made ready.

Figure 10:
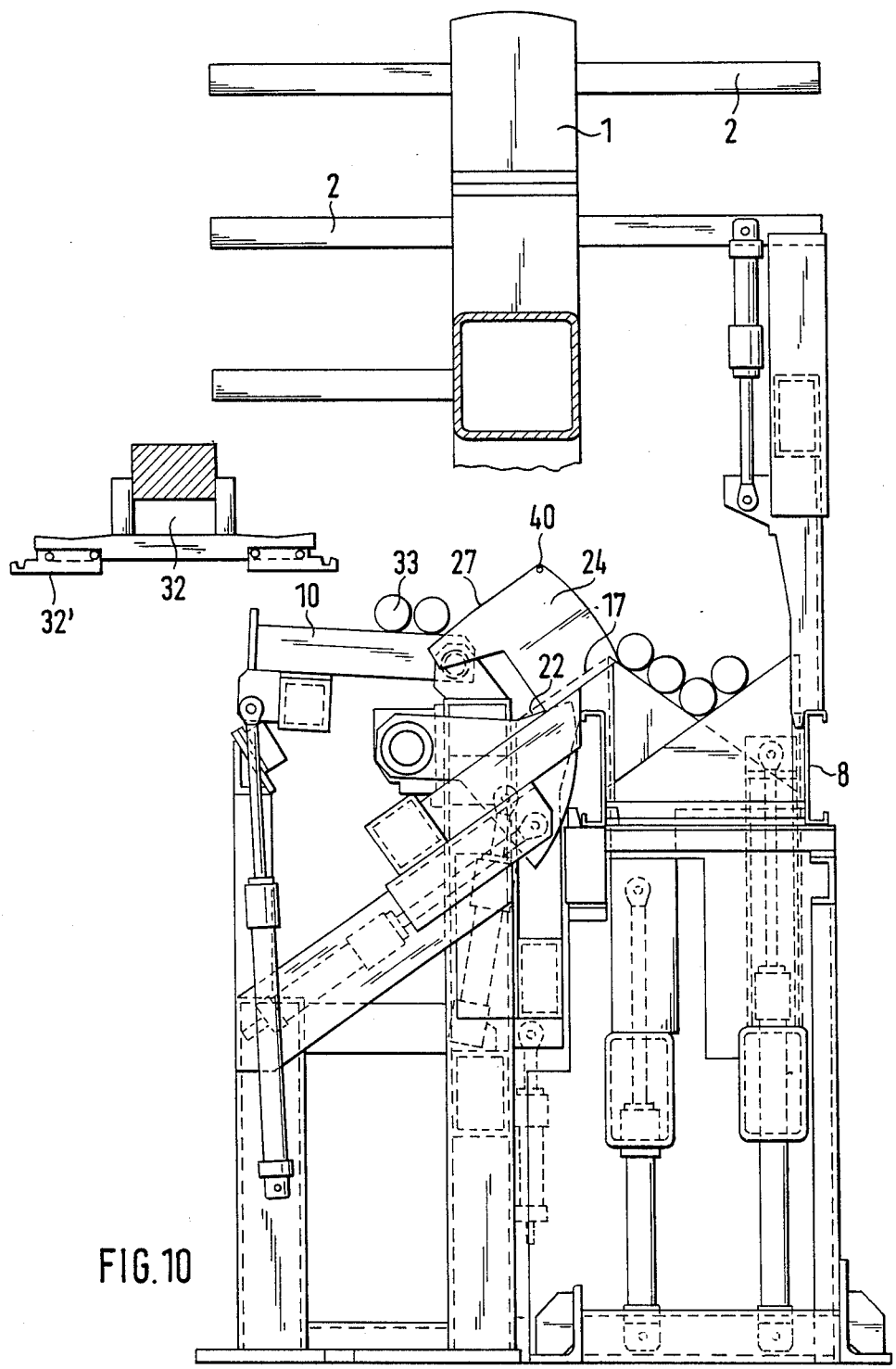

The bar elements 10, 10' permit removal of the rods 33 by the crane or hoist 32, 33, see also FIG. 10 and FIG. 2, for transport to a further utilization position, for example a machine tool for further working on the rods, other storage, or delivery. The bar elements 10 can also be formed as rollers (FIG. 1) so that the bar elements 10 will form a roller conveyor from which the rods 33 can be transported or pushed away in a direction transverse to the plane of FIG. 9.

The bar elements 10 can be inclined away from the position of the cassettes 8 by being pitched downwardly to the left (FIGS. 8, 9) further than shown in the drawings, in order to permit different types of rod elements to be readily handled, for example rods with rectangular cross section. If rods with such cross sections are to be transferred to a cassette—to be described below—the bar elements 10, 10' can be raised to be pitched towards the cassettes 8, by merely operating the cylinder-piston units 13.

LOADING OF A CASSETTE, WITH REFERENCE TO FIGS. 9 TO 12

Rods 33, present on the bar elements 10 or 10', can be placed in a cassette 8 by slightly inclining the bars 10, 10' towards the cassette—see FIG. 10. The hoists 32, 32' can place rods 33 on the bar elements 10 which, then, will slide or roll towards the upper surface 27 of the pusher 24, to be stopped by the surface 27.

Figure 11:
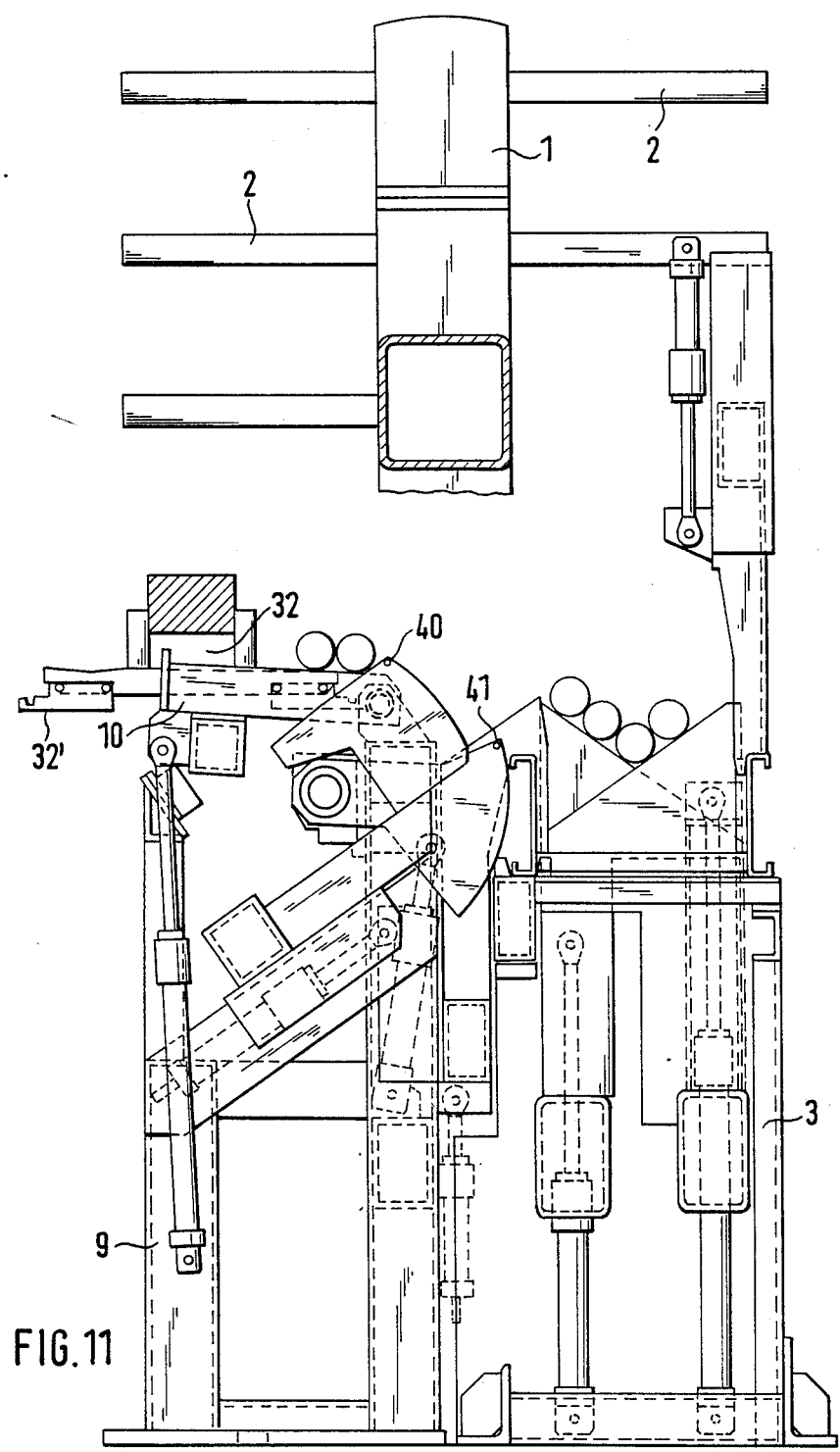

FIG. 1 illustrates the pusher 24 depressed. Let one consider the pusher 24 to be in the position shown in FIG. 1, but the pivot segment 18 pivoted outwardly as shown in FIG. 7, so that the edge 22 of the segment 18 can accept the forwardmost rod 33 and, by then pivoting the segment 18 downwardly, transferring the rod 33 on the slide path formed by the edges 17. In the next step, the sliders 24 are pushed forwardly which will feed the rod 33 over the edge formed by the slide path and the surface 33 of the plate 5, thus placing a rod in the notch formed by the two plates 4, 5, see FIG. 10. This sequence of events can also be used if, upon withdrawal of rods from the cassette 8, some excess rods rolled or slid on the slide path formed by the edges 17 and are to be returned to a cassette. The material remaining on the bar elements 10 could then be transported away, for example by the hoists 32, 32', as seen in FIG. 11, whereas material which was on the edges 17 is pushed back into the cassette by moving the segment 24 forwardly. Moving the segment 24 forwardly also separates the rods still on the bar element 10 from the remainder, so that only those rods on the bar element 10 can be picked up by the hoist 32, for further handling, for example for placement on one of the rack arms or tines 2.

Figure 12:
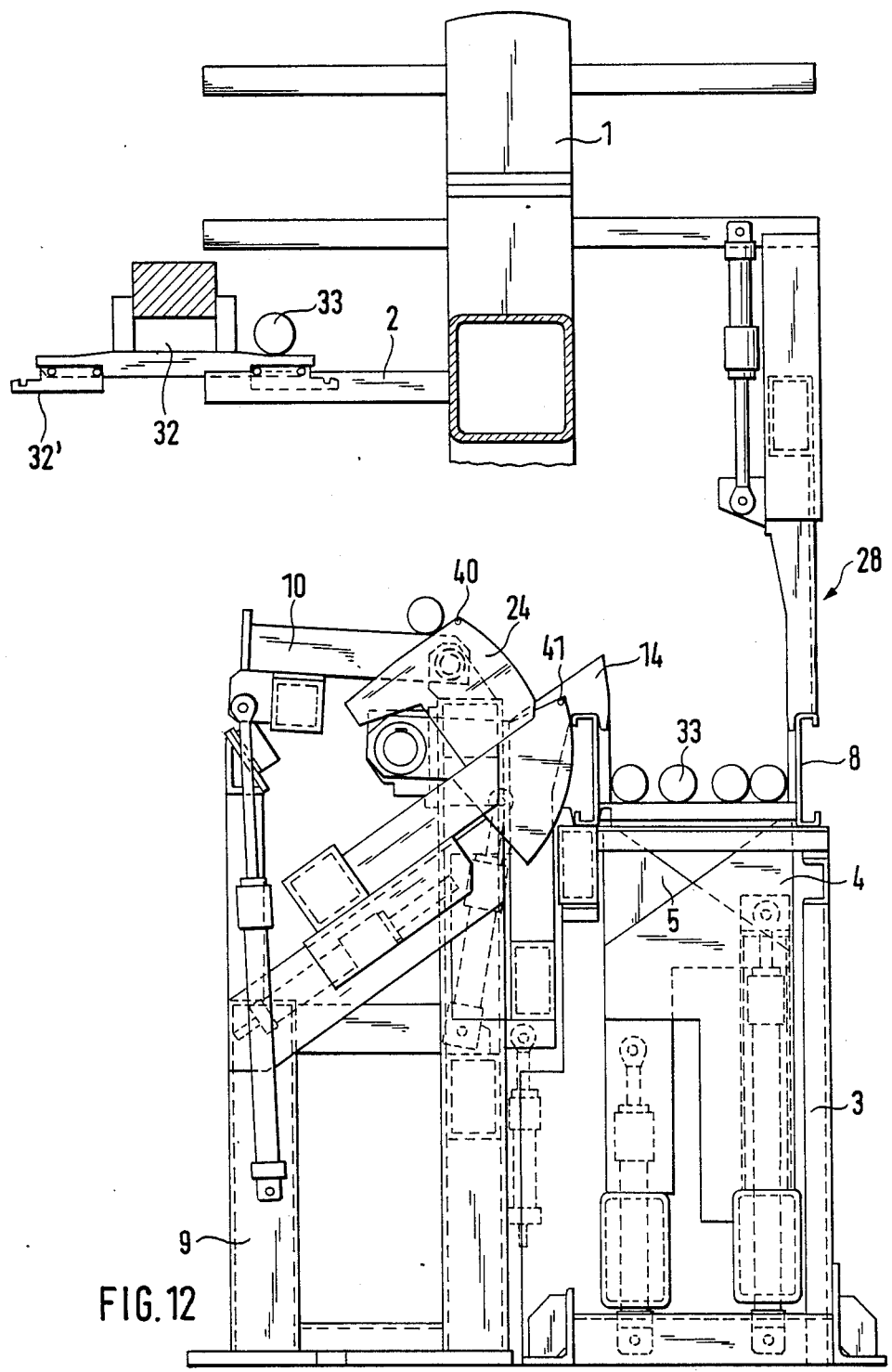

Simultaneous dropping of the pates 4, 5 prepares the cassette 8 for exchange by another cassette, as shown in FIG. 12. It is then only necessary to raise the hold-down element 14 and the hold-down arm 28, and the cassette 8 can be removed, for example by a hoist or crane, to a different location.

The apparatus can operate automatically, and flexibly, with a plurality of cassettes of different sizes and shapes, to transfer rod material 33 between the cassette and the bar elements or roller elements 10, 10'. The apparatus thus is suitable both to place material in the cassette as well as to remove material from the cassette, and permits individual handling of the rods 33, which, then, are also placed in clearly defined postions, without requiring specific stops or individual attention to the sizes and shapes of the rods, other than control of the respective movable elements. At the various positions in the operating cycle, V-shaped grooves for precise positioning of the material are always available, although the material can arrive in the cassettes 8 at random. It is placed on the bar elements 10, 10' in sequence.

Discrete handling of the rods 33 permits counting the rods regardless of whether they are transferred from the cassette to the bar elements or from the bar elements into a cassette. The sequence of operating steps can be easily controlled and monitored, and a count can be easily obtained relative to the quantity of material or rods which are in storage.

At least one of the sliders 24 has a sensor 40 located at the junction of the upper edge 27 with the forward edge 26. The sensor 40 can be an optical sensor, or a contacting-type sensor, in which the sensor responds when a rod 33 passes the sensor 40. Sensors 41 can also be located on one or more of the segments 18 at the region of transition between the terminal edge 21 and the upper edge 22 thereof. A signal is then obtained which indicates that a rod 33 is on the segment when the segment 18 is pivoted.

The sensors 40, 41 not only can provide information regarding the quantity of material, that is, what quantity for example will be transferred by the hoist 32, 32', but the possibility obtains that, by placing sensors on many or all of the sliders 24 and on many or all of the segments 18, the length of the respective rods can be determined with an accuracy of the spacing between the respective sliders and/or segments.

The slide path preferably is formed by the inclined upper edges 17 of the hold-down elements 14 which, all, are coupled to the common rail. Thus, synchronous positioning of the hold-down elements 14 is obtained so that they can readily grip the cassette by the notches 14'. The hold-down elements 14, thus, have a dual function since, for one, they hold the cassette in the position and, for another, they define the slide surface. If one cassette is to be exchanged against another, it is only necessary to raise the hold-down elements 14 upwardly, which releases the cassette. At that time, the slide path formed by the upper edges is not needed because no function thereof is required during the change of cassettes.

The pivot segments 18 have a terminal edge which is spaced slightly from the outer contour of the cassette 8 or, rather, the left wall 8b thereof. The pivot segments can pass beneath the edges 17 defining the slide surface, or can remain flush therewith. This construction of the pivot segments permits placing them close to the cassette so that the spacing between the frame 3 and the support 9 can be reduced to a minimum, thus reducing the overall size of the apparatus. Further, the accuracy with which small material, that is, small-diameter rods, can be handled, is improved. The stop means at the end of the slide surface, as described, preferably, are the sliders or pushers 24 which have a front edge concentric with the pivot axis of the segments 18. The result will be that rod material which is lifted from the slide path will be transported in a circular path, which is particularly simple, and is of low friction and low slide resistance.

The sliders 24 are preferably coupled to a common rail and, individually, form disk or plate elements. The group or row of sliders then is shifted parallel to the plane of the slide path by suitable longitudinal translation power elements, typically and preferably piston-cylinder units. They are shifted at an inclined upwardly extending path to such an extent that the lower end of the front edge passes at least along the longitudinal edge of the cassette. This is important since the stop function of the slider is also available to place the rods back into a cassette, that is, in transferring of rods from the bar elements 10, 10' to the cassette. The sliders can have lower rest positions which can be determined or controlled in accordance with the cross section of the material, so that they, simultaneously, will function as a separating element to separate, for example, adjacent rods as they are being handled. As the pivot elements 18 pivot, only a single rod is being transferred at a time, which improves counting permits controlled placement of predetermined numbers of rods 33 on the bar elements 10, 10'.

The bar elements, preferably, are rod units or the like, or rollers to form a roller conveyor, distributed along the length of the cassette. The horizontal space between the bar elements then can be used to place the sliders, the segments, and the like. Additional space is available, for example for insertion of the tines 32' of the hoist 32 between respective bar elements. The bar elements, by being pivotably returned, in approximately horizontal position but capable of inclination plus or minus from the horizontal permits ready placement of the rods 33 close to the end stop 30, or away therefrom, (FIG. 12) if rods are to be unloaded from the bar elements.

The degree of inclination which the bar elements receive permit matching to the diameter, material characteristics, and cross-sectional shape of the rods. For example, rods with square or rectangular cross section slide on the bar elements, whereas rods with circular cross section can roll. The inclination, thus, will depend on the distance which the respective rods have to cover as they move across the bar elements. The degree of inclination for circular rods can be very low; for square cross-section material, this may not be sufficient. Higher inclination, however, would cause round rods to roll off too fast, requiring special stops while, also, increasing the noise level within a storage shed or warehouse where the apparatus is located. Consequently, providing for variable inclination has environmental and material handling advantages.

Tilting the bar elements toward the right (FIG. 1), that is, towards the cassette, permits movement of the rods under gravity towards the sliders, so that they can be transferred to the cassettes by joint action of the sliders and the segments 18.

When forming the bar elements 10 as rollers, a roller conveyor is obtained so that, directly from the bar elements, rods 33 can be withdrawn longitudinally, for example for a cutting or sewing machine to cut the rods to predetermined lengths.

Feelers 40, 41 permit counting the rods which pass over the respective edges, and by placing feelers on all or a large number of the longitudinally staggered elements 24, 18, a determination of length can also be obtained. Counting the rods which pass the sensors permits recording the number of rods which are fed on the bar elements, or removed therefrom, so that by a simple program, the transfer apparatus also provides inventory information, as well as information of material available for further handling or working. This information is obtained in connection with change of cassettes, or loading and unloading of cassettes, without requiring any additional time. The information is available at the time the material is being handled and before it is transferred to a using apparatus.

Another arrangement which permits a more accurate length determination can utilize sliders 24 in which a plurality of sensors are located adjacent each other in longitudinal direction of the rod material. By evaluating signals from each of the respective sensors, longitudinally spaced along the length of the rods, an accurate determination of the length of the rods being transferred can be obtained. The sliders 24 can be, but need not be, plate elements and may have a significant extension in the longitudinal direction of the rods, or be coupled to an extension arm to carry additional sensors.

Various changes and modifications may be made within the scope of the inventive concept.

A suitable angle of the deflection of the bar elements 10, 10' from the horizontal is : ±35° which overall deflection is to be deemed to be included in the term "essentially horizontal".

I claim:

1. In combination with a rod storage rack (10, 10') and a holder cassette (8),
    an apparatus for transferring elongated articles including rails or rods (33) between the holder cassette (8) and the storage rack (10, 10'),
    wherein the storage rack comprises a plurality of longitudinally distributed, essentially horizontal support bar elements (10, 10'), and
    the holder cassette (8) has an interrupted bottom (34), side elements (8a, 8b) and, in plan view, is of essentially rectangular shape,
    said apparatus comprising
    support means (3) for positioning the holder cassette (8) laterally adjacent to, but spaced from the support bar elements (10, 10') and at an elevation which is below that of the support bar elements;
    lifting blades (4, 5) movable vertically through the interrupted bottom of the cassette for raising the rods located in the cassette from the bottom thereof;
    means (14) for defining a longitudinally interrupted slide path (17), which slide path extends essentially perpendicular to a longitudinal axis of the rods and is positioned laterally adjacent and above the upper edge of the adjacent side element (8b) of the cassette (8) and at an inclination away from the cassette and towards the support bar element (10, 10') and bridging said space between the holder cassette and the support bar elements (10, 10');
    stop means (24) located adjacent the lower side of the slide path (17), at least two of the support bar elements (10, 10') being located on either side of the stop means;
    a plurality of lifting means (18) located staggered along the length of the rods (33) between said longitudinally distributed support bar elements (10, 10') and movable from a position near said lower side of the slide path and beneath the means (14) for defining the slide path to a position above the slide path, past the stop means, and at least even with the level of the support bar element (10, 10') for transfer of said articles from the means defining the slide path along the stop means and onto said support bar elements (10, 10'); and
    means (12, 13) for pivoting the support bar elements (10, 10') from a horizontal position towards and away from the cassette by a limited distance to permit displacement of the rods (33) perpendicular to the longitudinal axes of the rods and longitudinally of said support bar elements (10, 10') by gravity.

2. The apparatus of claim 1, wherein said lifting means, each, comprises a pivoted segment (18) pivotable about a horizontal axis (19) parallel to that one of the side elements (8b) of the cassette adjacent the slide path (17) and from a position below the bar elements (10, 10') upwardly through the longitudinally interrupted slide path (17) and along the stop means (24) to at least flush with the support bar elements (10, 10').

3. The apparatus of claim 2, wherein the stop means (24) comprises a plurality of plate-like elements having a part-circular forward edge (26) which is concentric with the horizontal axis (19),
    and wherein the plate-like elements have an upper edge (27) which is approximately parallel to the slide path (17).

4. The apparatus of claim 3, further comprising a common connecting rail (26') connecting the plate-like stop elements (24) to form a row of aligned stop elements;
    and operating means (25) controlling the position of said row of stop elements and moving the stop elements in a plane parallel to said slide path (17) towards and away from the cassette for a distance in which the lower portion of the part-circular forward edge (26) projects at least beyond the longitudinal edge of the side wall (8b) of the cassette proximate to the slide path (17).

5. The apparatus of claim 3, including object sensing means (40) located at the intersection of the forward edge (26) and the upper edge (27) of the plate-like stop element (24) and providing an electrical output upon passage of a rod (33) within the sensing range of the sensing means to permit counting the number of rods passing said sensing means.

6. The apparatus of claim 1, wherein the lifting blades (4, 5) comprise plate elements having a width corresponding to the inner corss-sectional width of the cassette (8) and defining upper edges, the upper edge (36) of that one (4) of the blades remote from said slide path (17) being included towards said slide path, and the upper edge (35) of the plate (5) close to the slide path being inclined away from the slide path;
    and individual raising means (6, 7) individually controlling lifting or raising of said plates vertically along the support means (3).

7. The apparatus of claim 1, wherein said means (14) for defining the interrupted slide path comprises a plurality of plate-like hold-down elements (14) having upper edges (17) inclined away from the cassette (8) and defining said slide path; and
    positioning means (15) for vertically moving the plate-like hold-down elements, said hold-down elements being engageable with the side wall (8b) of the cassette proximate to said slide path for holding the cassette in position when rods (33) are being transferred between the cassette and the slide path.

8. The apparatus of claim 7, wherein the plate-like hold-down elements are formed with notches (14') adjacent an end portion proximate to said side wall (8b) of the cassette for engagement over the edge of said side wall.

9. The apparatus of claim 1, wherein said lifting means, each, comprises a pivoted segment (18) pivotable about a horizontal axis (19) parallel to that one of the side elements (8b) of the cassette adjacent the slide path (17) and from a position below the bar elements (10, 10') upwardly through the longitudinally interrupted slide path (17) and along the stop means (24) to at least flush with the support bar elements (10, 10');

wherein said pivot segments are formed with an outer edge surface (21) which is circular and concentric with said pivot axis (19), said outer edge (21) being spaced from the cassette; and wherein said pivot segments have an upper radial edge (22) which, when the pivot segments are pivoted in a lower position, is at least approximately parallel to the slide path (17).

10. The apparatus of claim 9, further including object sensing means (41) located at the intersection of the upper radial edge (22) and the part-circular edge (21) of the pivot segment (18) and providing an electrical output upon passage of a rod (33) within the sensing range of the sensing means to permit counting the number of rods passing said sensing means.

11. The apparatus of claim 1, wherein said pivoting means includes a coupling bar (12) coupling said bar elements (10, 10') together; and means (11) for pivotably supporting the bar elements at ends thereof adjacent said cassette.

12. The apparatus of claim 1, further including end stop means (30) on said bar elements (10, 10') at end portions thereof remote from the cassette.

13. The apparatus of claim 1, wherein said support bar elements (10) are rollers to form, conjointly, a roller conveyor section.

14. The apparatus of claim 1, further including power operating means (6, 7, 13, 15, 20, 25) respectively coupled to the lifting blades (4, 5), said means (14) for defining the slide path (17), said stop means (24), and said lifting means (18).

15. The apparatus of claim 14, wherein said operating means comprise fluid-operated piston-cylinder units.

16. The apparatus of claim 1, further including power sensing means (40, 41) located on at least one of: said stop means; said plurality of lifting means, and sensing passage of a rod (33) over or adjacent said sensing means, said sensing means providing electrical output for counting of rods passing said sensing means.

17. The apparatus of claim 5, wherein said sensing means comprises a contactless sensor.

18. The apparatus of claim 5, wherein said sensing means comprises a contacting or engagement sensor.

19. The apparatus of claim 1, wherein the stop means (24) comprises a plurality of plate-like elements having a part-circular forward edge (26) which is concentric with a horizontal axis (19), and wherein the plate-like elements have an upper edge (27) which is approximately parallel to the slide path (17).

20. The apparatus of claim 1, whrein said means (14) defining the interrupted slide path comprises a plurality of plate-like elements (14) having upper edges (17) inclined away from the cassette (8) and defining said slide path.

* * * * *